United States Patent [19]
Wallace et al.

[11] Patent Number: 5,926,031
[45] Date of Patent: Jul. 20, 1999

[54] HIGH SPEED DIGITAL BUS TERMINATION

[75] Inventors: Dean Wallace, Trabuco Canyon; Chan Shufan, Anaheim Hills, both of Calif.

[73] Assignee: LinfinityMicroelectronics, Inc., Garden Grove, Calif.

[21] Appl. No.: 08/739,372

[22] Filed: Oct. 29, 1996

[51] Int. Cl.$^6$ .............................................. H03K 19/0185
[52] U.S. Cl. .............................................. 326/30; 326/86
[58] Field of Search .............................. 326/30, 86, 82; 333/22 R; 375/257

[56] References Cited

U.S. PATENT DOCUMENTS

| | | |
|---|---|---|
| 5,239,658 | 8/1993 | Yamamuro et al. |
| 5,422,608 | 6/1995 | Levesque ................................. 333/22 R |
| 5,510,727 | 4/1996 | Culmer et al. ............................. 326/30 |
| 5,559,448 | 9/1996 | Koenig ..................................... 326/30 |
| 5,585,741 | 12/1996 | Jordan ...................................... 326/30 |
| 5,680,060 | 10/1997 | Banniza et al. ........................... 326/30 |

FOREIGN PATENT DOCUMENTS

WO9529532  11/1995  WIPO.

OTHER PUBLICATIONS

Tsividis, Banu, and Khoury; IEEE Journal of Solid–State Circuits, Continuous–Time MOSFET–C Filters In VLSI; vol. SC–21, No. 1, Feb. 1986.

Gopalan, Vitunic; Silicon Valley Personal Computer Design Conference, An Optimized Active SCSI Termination Technique; Santa Clara Convention Center, Santa Clara, CA, Jul. 20–22, 1993.

Scherer, "SCSI Active Termination," *Elektor Electronics*, vol. 19, No. 213, p. 63, Jul. 1993.

Urban, et al., "Choosing Proper Terminators for the SCSI–Bus System Environment," *Electronic Design*, vol. 41, No. 18, pp. 87–97, Mar. 18, 1993.

Search Report for PCT/US97/17950 dated Feb. 17, 1998 corresponding to U.S. Application No. 08/739,372.

*Primary Examiner*—Jon Santamauro
*Attorney, Agent, or Firm*—Knobbe, Martens, Olson & Bear, LLP

[57] ABSTRACT

Novel methods and apparatuses for terminating busses are disclosed based upon the number of devices secured to the bus. The impedance of the bus lines varies with the number of devices coupled to the bus. The number of devices coupled to the bus line is determined and a precision resistor is selected based upon the number of devices coupled to the bus matching the expected impedance of the bus. A voltage is generated across the precision resistor with a known current and that voltage is compared with the voltage generated across a controllable resistances such as a FET biased in the linear mode with a like current passing through the fed. A feedback network provides a control voltage to the control electrode of the FET to control the resistance of the FET so that the resistance of the FET equals the selected precision resistance. The same control voltage is coupled to the control electrode of other controllable resistances such as FETs operating in the linear region with each FET terminating a separate signal line. Hence, each FET has a resistance about equal to the resistance of each of the signal lines at the predetermined impedance.

26 Claims, 4 Drawing Sheets

HIGH SPEED DIGITAL BUS TERMINATION

BACKGROUND OF THE INVENTION

1. Area of the Invention

This invention relates to digital bus termination and more importantly relates to matched impedance termination.

2. Description of the Prior Art

As bus speeds such as those used in computers have increased in speed of operation, attention to RF analog design techniques in designing the buses have become of increasingly greater importance. While at bus speeds of 10 MHZ or below, such analog techniques may be ignored, at higher bus speeds, for example, impedance matching becomes a significant consideration. Tests have established that at bus speeds beyond 10 MHZ, if significant impedance mismatching occurs, reflections on the bus may cause data or address errors on the bus with digital ones being detected as zeros or digital zeros being detected as ones.

To overcome these problems, a number of design changes have been made. First, in dedicated high speed backplane buses where design parameters are well controlled, precision resistors may be used for proper termination. However, in conventional personal computers such as IBM PC compatibles and MAC compatibles, such designs are not readily practical.

One attempt at impedance matching, the original SCSI specification (now called SCSI-1) specified a 132Ω resistor formed by two resistors, one coupled from the bus to Vcc and the other coupled from the bus to ground. However, practical considerations caused problems. For example, typical commercially available resistor are not accurate enough to provide an accurate 132Ω impedance. As a result, impedance mismatching occurred. In addition, such resistor terminators generally had to be re-installed as a plug in module as each device was added to the SCSI bus. However, since often the person adding a SCSI device is not a skilled computer technician, but may be an ordinary consumer, problems arise due to improper installation of the terminators.

A still further problem with such terminators is that as more devices are added to the bus, the impedance characteristics of the bus changed. This caused impedance mismatching that could not be readily overcome by matching with fixed resistor terminators.

Therefore, to overcome some of these drawbacks, terminator standards were developed that had specified voltage and current characteristics. For example, the SCSI-2 standard requires a specific voltage current profile. For voltages above 2.85 volts, the terminator is supposed to appear as a voltage source of 2.85 volts. For voltages below that level, the terminator is suppose to appear as a current source of 24 mA driving a 110Ω of resistor. However, graphing the voltage current curve of that specification shows that the voltage current curve has a ninety degree angle, which at best can only be approximated by a Boulay terminator or a transistor current source. Still further, the 110Ω resistor is also not easily produced precisely in circuitry leading to impedance mismatching. To attenuate reflections resulting from such mismatching, however, the circuits are also commonly provided with over and under voltage clamps that limit the voltage excursions. This creates increased cost and complexity.

An additional drawback of terminators according to the SCSI standard is that they draw considerable excess current. In an addressing scheme with for example thirty two address lines, sixty four bits of data lines, plus various other chip enable and read and write enable lines, over 100 lines may need termination. Using the SCSI-2 standard of 24 mA for over one hundred lines means that termination will require 2.4 amps of current. For five volt circuits this means that the termination will require ten watts. Ten watts of power, however, in a portable computer such as a notebook size computer will waste battery power and contribute to excessive heating of the unit.

A further problem with such terminators arises with the inclusion of terminators on computer buses where the number of devices might change. Examples include high speed computer buses such as used for system memory, PCI buses or video cards memory buses. For example, many PC's are sold today with either 8 MB or 16 MB of memory installed using 30 or 70 pin Single In-line Memory Modules (SIMM's). Those SIMM's provide for ready expandability of system or video memory such as by installing additional SIMM's or replacing the original SIMM's with SIMM's containing more memory. Often users of those PC's find it necessary to increase the amount of memory to 32 MB or more to run applications or run multiple applications efficiently based upon software upgrades or operating system upgrades. Still further, many video boards are sold with only half or less of the maximum memory of the board installed to hold down cost of the system. When the typical consumer adds more SIMM's to the system or adds more memory to the memory card, the impedance of the address, data, chip enable and select lines change. Similar effects can be found with video cards where more memory is added to the video cards. It is difficult to properly terminate the bus as the bus impedances will vary with the number of components. Use of plug-in terminators such as for SCSI-1 have drawbacks as consumers frequently install the terminators incorrectly.

Therefore, it is a first object of the invention to provide a precise impedance match for the characteristics of the bus irrespective of the number of devices connected to the bus. It is a second object of the invention to provide such impedance matching that may be readily used by the home consumer. It is a third object of the invention to permit the impedance of the bus to vary with the number of device coupled to the bus. It is yet another object of this invention to provide such termination with minimal power consumption. It is still yet another object of this invention to provide such termination with readily producible circuits and minimizing expensive components such as precision resistors.

SUMMARY OF THE INVENTION

These and other objects of the invention are accomplished by an improved terminator resistor requiring almost one precision resistor, two constant current sources, a high gain operational amplifier and a plurality of controllable resistances comprised of a FET or bipolar transistor operating in the linear region. A first of the constant current sources is coupled to generate a voltage across the precision resistance. A second of the constant current sources, having an identical current as the first current source is coupled to generate a voltage across a FET or bipolar transistor operating in the linear range. The voltage across the precision resistance and the FET are monitored with a high gain operational amplifier having low DC offsets and input currents. The output voltage of the operational amplifier is provided to the control electrodes of a plurality of the transistors having identical performance characteristics as the first transistor and preferably having a second of the electrodes of the transistors coupled to the same node as the second electrode of the first transistor to thereby provide a plurality of resistances precisely matching the resistance of the precision resistance. Each of these transistor's resistances provides an accurate impedance match to the precision resistor.

In a preferred embodiment of the circuit, the precision resistor is varied to match the measured impedance of the bus lines as the number and types of devices coupled to load the bus varies. The transistors terminating the bus lines also mirror the resistance of the precision resistor, thereby providing a controlled matching of the resistance for each line as the load on the bus changes. In alternative embodiments, automatic selection of the prevision resistance is provided.

DETAILED DESCRIPTION OF THE PREFERRED EMBODIMENTS

Figure 1:
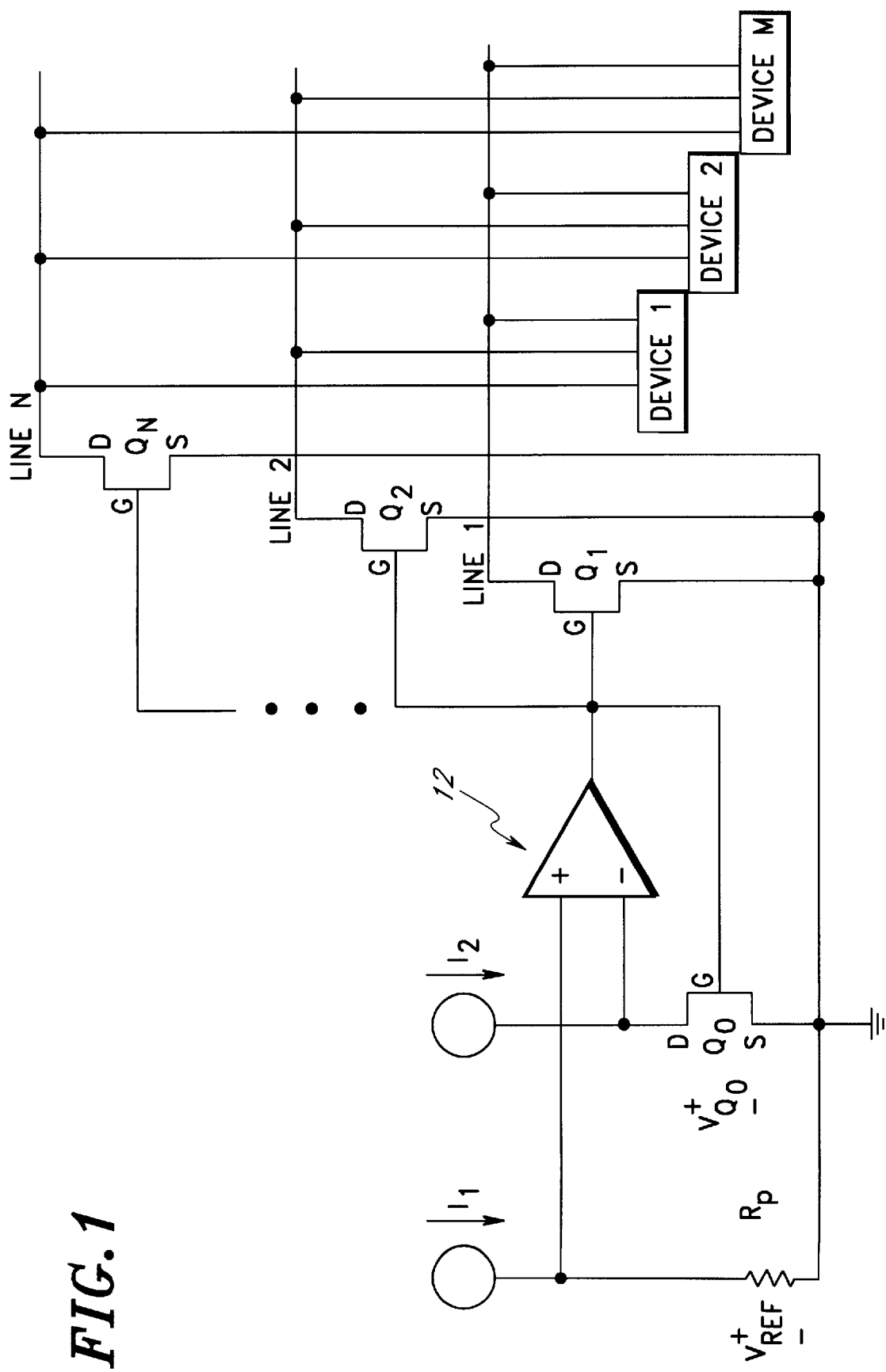
FIG. 1 is a diagram of first embodiment of the invention.

FIG. 1 is a simplified diagram of a first embodiment 10 of the invention. A plurality of N controllable resistances, $Q_1$ through $Q_N$, which preferably are MOSFETs, are coupled to bus signal lines 1 through N, respectively, through the FET's drains D. Each of bus lines 1 through N are coupled also to one or more devices D1, D2, ... DM, which may comprise any device that may be coupled to a bus such as memory (such as RAM, ROM, SIMM's, SIPPS, EPROM, SRAM, DRAM, VRAM, GRAM, EDO RAM), a video controller integrated circuit or card, a DMA integrated circuit, a PCI to ISA bus interface integrated circuit, a hard disk drive, an optical or magneto-optical drive, a network adapter card, a digital camera, a video capture card, a PCMCIA interface controller, an optical scanner, a modem, or any other device, card, or circuit that may be coupled to the bus. The impedance of each of the bus lines will be approximately the same but will vary with the number of devices D1, D2 . . . DM attached to the bus. This nominal impedance of the lines for any of the possible number of devices attached to the bus can be determined by, for example, measuring the impedances.

Once the impedance of a bus line is determined, a precision impedance $R_P$ matching the measured impedance for the number of devices actually attached to the bus is selected. The precision impedance may be a wire wrap or carbon film resistor or a laser trimmed integrated resistor. A current source $I_1$ which is preferably temperature compensated, provides a reference current and is coupled to the precision impedance $R_P$, thereby generating a voltage $V_{REF}$ across the resistor $R_P$. A FET $Q_O$ operating in the linear region is also provided with the source (S) of the FET $Q_O$ coupled to ground and the drain (D) coupled to a second preferably current source $I_2$. The current source $I_2$ preferably provides a current that is equal in magnitude to the current provided by the current source $I_1$. Since a current $I_2$ is flowing through the transistor $Q_O$ operating in the linear region, the voltage $V_{QO}$ across the transistor $Q_O$ varies linearly with the current $I_2$. Both of the voltages $V_{REF}$ and $V_{QO}$ are provided respectively to the noninverting and inverting inputs of a high gain operational amplifier 12 (preferably temperature compensated and with DC offset compensation) that generates an output feedback signal proportional to the difference between the two voltages. That output feedback signal is coupled to the control terminal (the gate G) of transistor $Q_O$ and controls the impedance so that the two voltages $V_{REF}$ and $V_{PO}$ are equal. As a result, since the two references currents, $I_1$ and $I_2$ are equal and the voltages are kept equal by using negative feedback from amplifier 12, according to Ohm's law, the resistance of FET $Q_O$ must equal the resistance of the precision reference resistor $R_P$.

Thus, FET $Q_O$ acts as a variable resistance that tracks the resistance of $R_P$. Further, each of FET's $Q_1$ through $Q_N$ has a drain D coupled to a corresponding different ones of the bus lines 1 through N to terminate the bus lines. The sources (S) of FETs $Q_1$ through $Q_N$ are coupled together to the same node (ground here) and the gates (G) are coupled together to the same node as the gate of transistor $Q_O$ and are also responsive to the output of the amplifier 12. Further, each of FETS $Q_1$ through $Q_N$ also has an impedance of substantially equal to the resistance of $R_P$ since the gates and sources of transistor $Q_1$ through $Q_N$ have the same gate to source voltage as transistor $Q_O$ and transistors $Q_1$ through $Q_N$ are operating in the linear range. Since each of the bus lines is terminated with an impedance substantially equal to the resistance of resistor $R_P$ and resistor $R_P$ is approximately equal to the impedance of each of the bus lines (based on the number of devices M secured to the bus), the bus lines are properly terminated with the appropriate impedance.

Optimally, each bus line may also be terminated with an over voltage clamp and/or an under voltage clamp (not shown). Also, by fabricating at least each of the current sources $I_1$ and $I_2$ with current on an integrated circuit mirrors and transistors $Q_O$ through $Q_N$ with the same dimensions on the same integrated circuit, a high degree of impedance matching can be attained.

Figure 2:
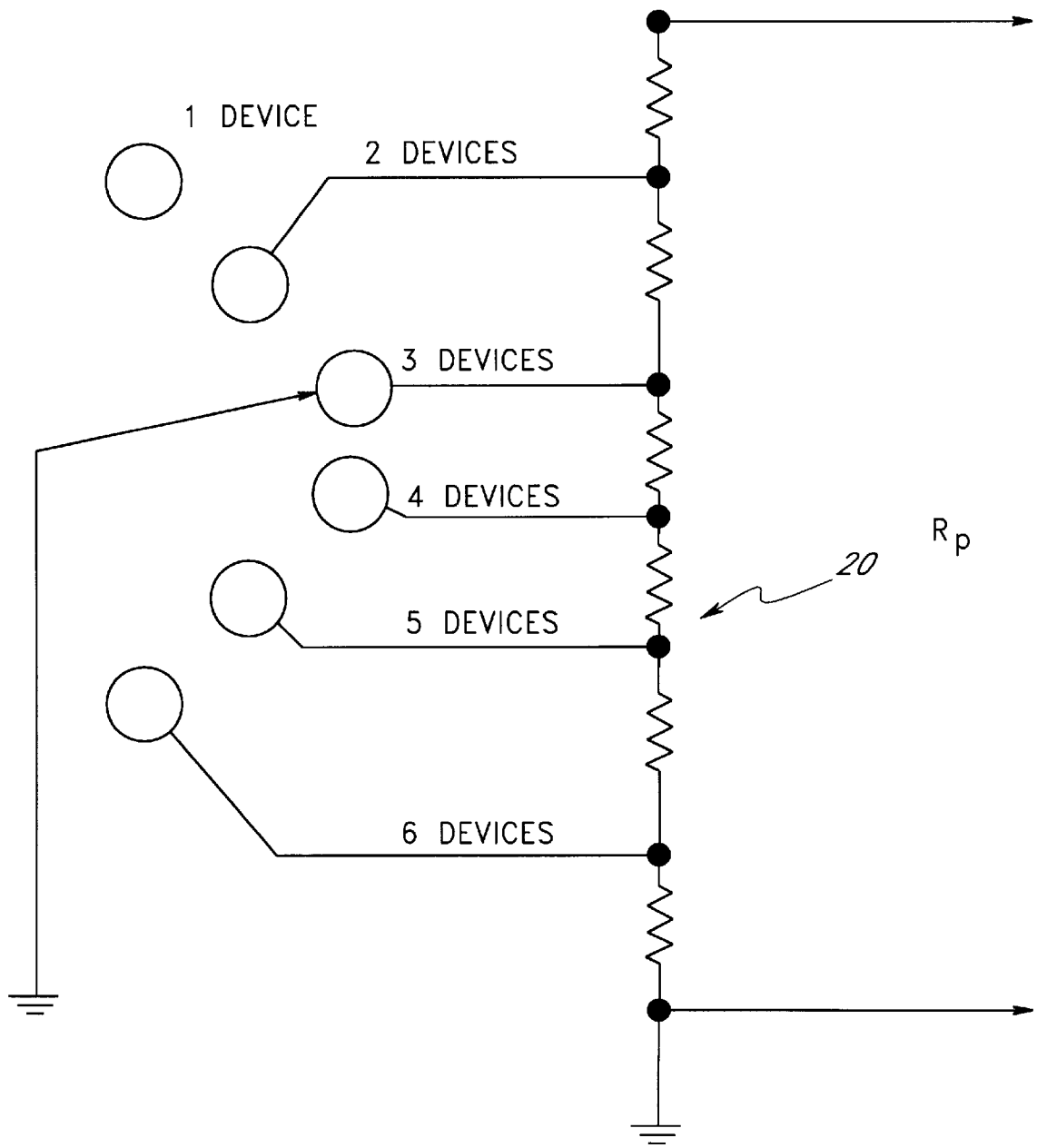
FIG. 2 is a diagram of one version of a varying precision resistor provided for matching purposes.

FIG. 2 discloses a functional representation of a first mechanism for selecting the value of the precision resistance $R_P$ so that only one precision resistance is needed. The nominal impedance for each of the bus lines for the various different number of devices permitted to be coupled to the bus is predetermined such as by measurements. Then a precision multitap resistor 20 is provided as a substitute for resistance $R_P$ as shown in FIG. 2 with the resistance being set by selecting the switch 22 to positions appropriate to the number of devices coupled to the bus is provided. By selecting the appropriate switch position, the appropriate precision resistance is provided as shown in FIG. 2. Of course, in preferred embodiments switch 22 is a DIP toggle switch arranged to provide with appropriate logic on the PC board to provide the functionality of a rotary switch.

Such a technique will work with switching to select the impedance because in general, the impedance of bus on lines decrease as more devices are coupled to the bus. Thus one can readily fabricate a prevision multitap resistor from series resistors.

Figure 3:
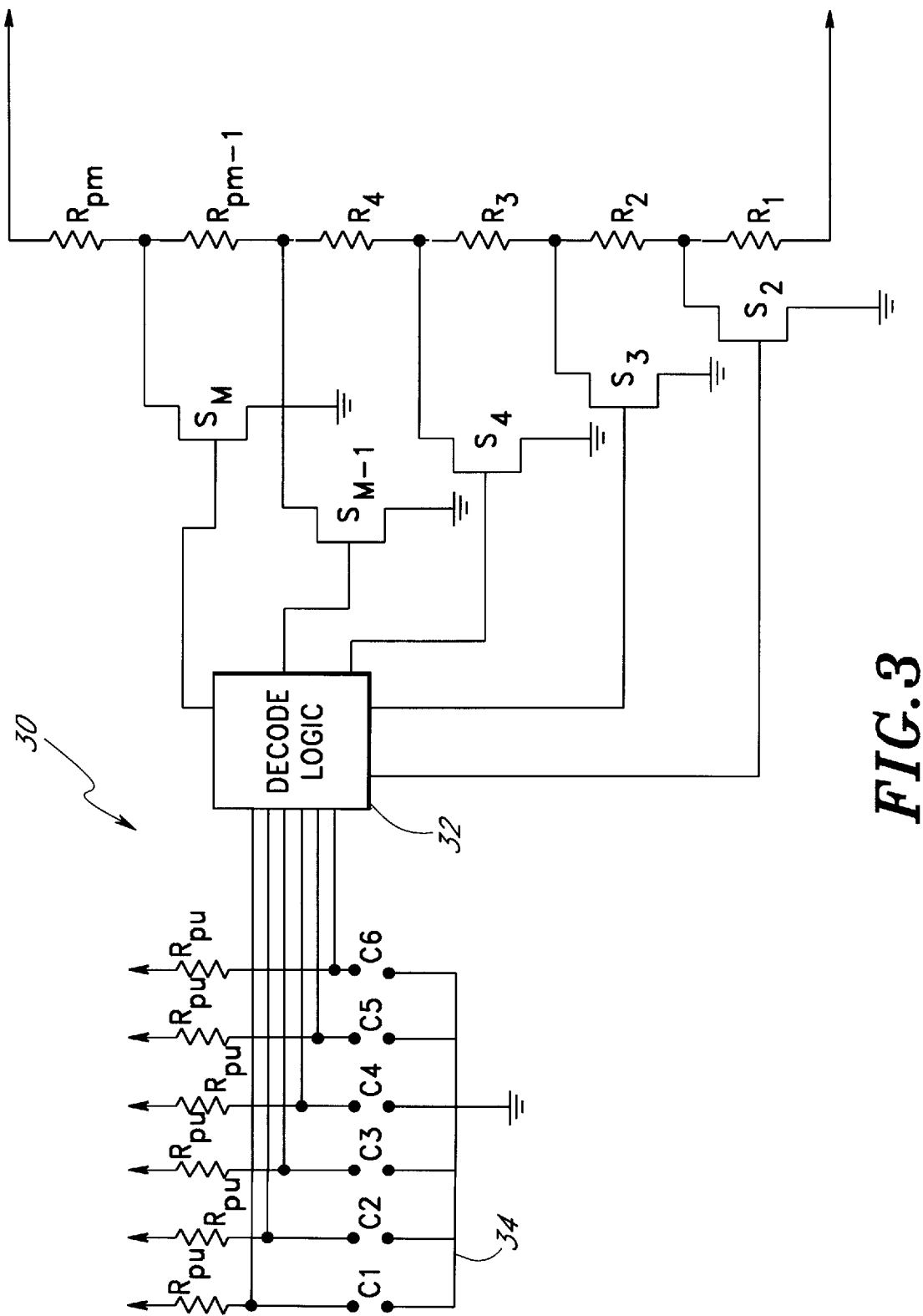
FIG. 3 is a diagram of a second version of the varying precision resistor.

As a further alternative 30, shown in FIG. 3, instead of providing a switch with a multitap resistor, the switching function can be attained by providing slots using circuitry 34 including contacts on the connector slot that couple a separate pull up resistance $R_{PU}$ to ground when a device is coupled to the bus line is in use. The connector for each slot has a pair of contacts, $C_1, C_2, \ldots C_M$ (where in the case shown M=6), one of which is coupled to the separate pull up resistor $R_{PU}$, the other of which is coupled to the ground. When the mating connector for connecting a device to the bus is coupled to the bus at the connector, the mating connector not only couples the device to the bus but also couples the two contacts for that connector together. Using simple hardware or software decode logic 32 that provides both the functionality of switch 22 and the determination of the number of devices coupled to the bus based on the number of high and low signals, one of the switches $S_2$ through $S_M$ will be conducting to provide the appropriate resistance $R_P$ unless only one slot is used in which case none of the switches conduct.

Each of the resistors $R_1$ through $R_{PM}$ are precision resistors selected so that when only one of slots 1-M is used, $R_1+R_2+ \ldots R_M$ is equal to the bus line impedance for one device on the bus, when two slots are filled, $R_2+R_3+ \ldots R_M$ equals the line impedance when two of slots $C_1$ through $C_M$ are used. Similarly, for three of slots 1 through M being used, the resistance of $R_3+R_4+ \ldots R_M$ must equal the impedance for three devices to be coupled to the bus, and so on.

Preferably all of the decode logic 32 switches $S_2$ through $S_M$ and the resistors $R_1$ through $R_{PM}$ are fabricated on an integrated circuit along with FETs $Q_O$ through $Q_N$, amplifier 12 and current sources 11 and 12. Current sources $I_1$ and $I_2$ should be temperature compensated for the temperature coefficient to resistances $R_1$ through $R_{PM}$ being formed in silicon. In addition, resistances $R_1$ through $R_{PM}$ can be made precision resistances by either laser trimming or by using fuses that are blown during wafer probe.

Figure 4:
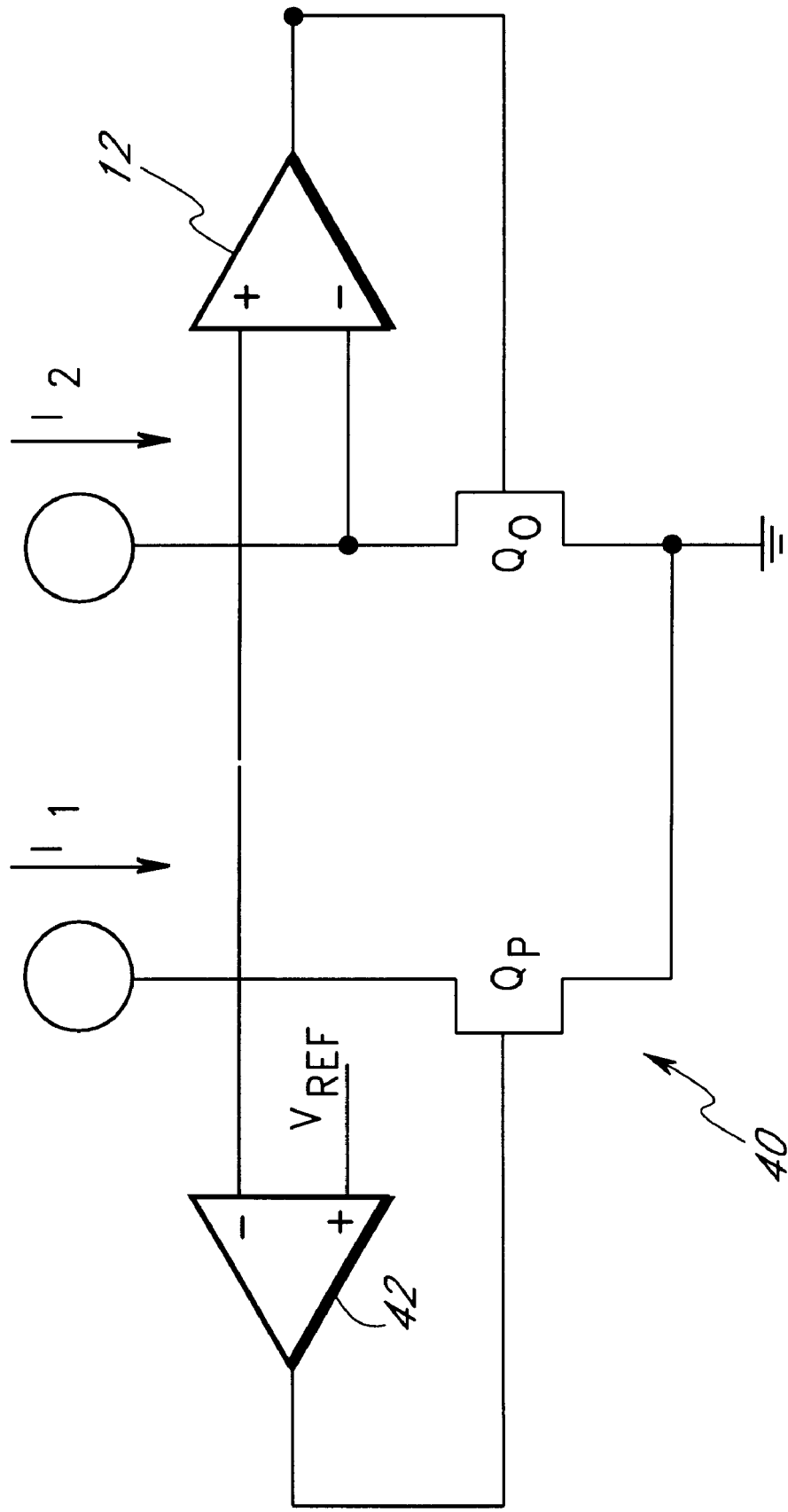
FIG. 4 is a diagram of circuitry for automatically configuring the precision resistance.

As a still further alternative, the partial circuit 40 of FIG. 4 may be used in lieu of the resistor $R_P$ in FIG. 1. Current I passes through transistor $Q_P$ which is preferably identical to transistor $Q_O$. Amplifier 112 controls the conductivity of transistor $Q_P$ so that the voltage across transistor $Q_P$ is equal to $V_{REF}$. Of course, by controlling $V_{REF}$, the impedance of transistor $Q_P$ can be controlled as is apparent from Ohms law. To control the voltage $V_{REF}$, the circuit 30 of FIG. 3 can be used in a bandgap generator to alter the voltage supplied at $V_{REF}$. In addition, rather than use transistor $Q_P$, a current source I, and amplifier 42, $V_{REF}$ can be coupled directly to the noninverting input of amplifier 12.

While specific embodiments of the circuit have been disclosed, it will be apparent to those of skill in the field that other alternative designs are readily apparent. It will also be readily apparent to those of ordinary skill in the field, that the means for generating the reference precision resistance will be almost infinite. Still further, the logic circuits can be provided by a microcontroller. Therefore, the scope of the invention should be measured by the claims.

We claim:

1. A terminator for a computer bus having a plurality of bus lines, each of the bus lines having an impedance that varies with at least the number of devices coupled to the bus, the approximate impedance for each line being known for each possible number of devices coupled to the load, the terminator comprising:

one of either a first sensing current source or a current sink having a predetermined current, a first adjustable resistance coupled between a common node and the node of the current source or the current sink to produce a first sensed voltage across the first adjustable resistance, the resistance of the first adjustable resistance being adjustable precisely to any of the approximate impedances;

a control to alter the resistance of the first adjustable resistance based on the number of devices coupled to the bus;

a second adjustable resistance having first and second nodes and a control node, the resistance of the second adjustable resistance being adjustable at least in part by the voltage between the control node and one of the first and second nodes;

one of either a second sensing current source or sink having a second current in a predetermined ratio with the predetermined current, the second current flowing between the first and second nodes of the second adjustable resistance to the common node to produce a second sensed voltage across the second adjustable resistance;

a circuit responsive to the first and second sensed voltages, to generate a control signal for the control node of the second adjustable resistance such that the first and second adjustable resistances are substantially equal;

a plurality of additional adjustable resistances having first and second nodes and a control node, the resistance of the additional adjustable resistances being adjustable at least in part by the voltage between the control node and one of the first and second nodes, one of the first and the second node of each additional adjustable resistance being coupled to the common node and the control node of each additional adjustable resistance being coupled to the control signal so that the resistance of the plurality of additional adjustable resistances mirrors the resistance of the second adjustable resistance; and first circuitry indicating the number of devices coupled to the bus and second circuitry responsive to the indication of the number of devices coupled to the bus controlling the resistance of the first adjustable resistance to have a predetermined ratio with the approximate impedance.

2. The terminator of claim 1, wherein the first adjustable resistance comprises a plurality of resistors coupled as a network by a plurality of switches having opened and closed states, the resistance of the plurality of resistors being determined by which of the switches is opened or closed, the operation of the switches being determined by the second circuitry.

3. A circuit for terminating a plurality of bus lines, the resistance of the bus lines varying at least in part with the number of devices coupled to the bus, the resistances with each of the number of lines being known, the circuit comprising:

first circuitry configured to determine the number of devices coupled to a bus, said bus comprising multiple bus lines;

second circuitry responsive to the first circuitry, the second circuitry configured to adjust the value of a first resistance to substantially match the impedance of at least one of the bus lines;

a second resistance having a control terminal which alters the resistance of the second resistance;

a pair of parameter generators generating either a voltage across the first and second resistances or a current through the first or second resistances; and a feedback network responsive to either the voltage across the first and second resistances or the current through the first and second resistances to set the resistance of the second resistance to be a predetermined ratio of the first resistance.

4. The circuit of claim 3, wherein the circuit includes a plurality of additional controllable resistances, each additional controllable resistance having a control terminal coupled to the control node of the second resistance such that the resistance of each of the additional controllable resistances is substantially equal to the resistance of the second resistance, each of the additional controllable resistances terminating a different line of the bus.

5. The circuitry of claim 4, wherein the feedback network consists of a high gain differential amplifier.

6. The circuitry of claim 5, wherein each of controllable resistances is a transistor operating in the linear range.

7. A method for terminating a plurality of bus signal lines, with the impedance of the bus signal lines varying with how many devices are coupled to the bus, the impedance of the bus lines being predetermined for each of the possible number of devices that are possible, the method comprising:

determining with first circuitry the number of devices coupled to a bus, the bus comprising a plurality of bus lines;

determining with second circuitry a first impedance which is approximately equal to the impedance associated with the number of devices coupled to the bus;

terminating a plurality of the bus lines with a controllable resistance having an impedance, the impedance of each controllable resistance being established at least in part through a control terminal; and generating a control signal on each of the control terminals so that each terminated bus line is terminated with an impedance approximately equal to the first impedance associated with the number of devices that have been determined.

8. The method of claim 7, wherein the method of generating the control signal comprises:

causing a voltage to be generated across a first controllable resistance, the voltage being generated by a current;

causing a voltage to be generated across a second controllable resistance having a control terminal establishing the resistance based upon a signal on the control terminal;

comparing the voltages across the first and second controllable resistances; and based upon the comparison of the voltages generating the control signal.

9. The method of claim 8, wherein the comparing is done with a high gain operational amplifier that produces the control signal.

10. The method of claim 7, wherein the method of generating the control signal comprises:

generating a voltage across the first controllable resistance with a known current;

generating a voltage across the second controllable resistance with said known current; and generating the control signal with a high gain operational amplifier.

11. The process of claim 1, wherein the method of generating the control signal comprises generating a voltage across the first controllable resistance.

12. The process of claim 11, wherein the method of generating the control signal further comprises:

generating a voltage across the second controllable resistance;

controlling the second controllable resistance so that the voltage across the second controllable resistance is at a predefined ratio of the voltage across the first controllable resistance.

13. The process of claim 12, wherein the generating the voltage across the first and second controllable resistances is by passing currents of substantially equal magnitude through each of the first and second controllable resistances.

14. A process of making a terminated computer bus including a plurality of separate bus signal lines, each of the bus signal lines having approximately the same impedance as the other of the plurality of bus signal lines, the bus adapted to having a variable number N of devices attached to the bus and the approximately the same impedance varying with the number of the devices coupled to the bus, the process comprising:

determining with first circuitry the attachment of an Nth device to a bus, the bus having multiple bus signal lines;

adjusting with second circuitry a first impedance to approximate the impedance associated with the number of N devices attached to the bus;

terminating each of the bus signal lines with a controllable impedance; and controlling the impedance of each of the controllable impedances based on the first impedance.

15. A bus controller comprising:

a bus having multiple bus lines;

first circuitry configured to determine the number of devices coupled to the bus; and second circuitry in communication with the first circuitry, the second circuitry responsive to the number of devices determined by the first circuitry, the second circuitry configured to adjust at least one terminating impedance on at least one of the bus lines to substantially match the impedance of the bus line.

16. The bus controller of claim 15 wherein said first circuitry is in communication with slots attached to the bus.

17. The bus controller of claim 16 wherein the first circuitry determines how many devices are connected to the bus by monitoring the number of devices paced in the slots.

18. The bus controller of claim 16 wherein each slot has a connection which is in a first state when a device is not connected to the slot and a second state when a device is connected to the slot.

19. The bus controller of claim 15 wherein the second circuitry further comprises a feedback circuit which adjusts the terminating impedance at least on one of the bus lines to substantially match the impedance of the bus line.

20. The bus controller of claim 16, wherein the feedback circuit comprises a high gain differential amplifier.

21. A method for controlling a bus, said method comprising the acts of:

determining with a first circuit the number of devices coupled to a bus, the bus comprising multiple bus lines; and adjusting with a second circuit the terminating impedance of at least one bus line to substantially match the impedance of the bus line.

22. The method of claim 21, wherein the act of determining with a first circuit he number of devices coupled to the bus further comprises communicating with slots attached to the bus.

23. The method of claim 22 wherein the act of determining with a first circuit the number of devices coupled to the bus further comprises monitoring the number of devices placed in the slots.

24. The method of claim 22 further comprising the acts of placing a connection on the slot in a first state when a device is not connected to the slot and placing the connection on the slot in a second state when a device is connected to the slot.

25. The method of claim 21 wherein the act of adjusting with a second circuit the terminating impedance further comprises using a feedback circuit to adjust the terminating impedance of at least one of the bus lines to substantially match the impedance of the bus line.

26. The method of claim 25, wherein the act of adjusting with a second circuit the terminating impedance further comprises using a high gain differential amplifier to adjust the terminating impedance of at least one of the bus lines to substantially match the impedance of the bus line.

* * * * *

UNITED STATES PATENT AND TRADEMARK OFFICE
CERTIFICATE OF CORRECTION

| | |
|---|---|
| PATENT NO. | : 5,926,031 |
| DATED | : July 20, 1999 |
| INVENTOR(S) | : Dean Wallace et al. |

It is certified that error appears in the above-identified patent and that said Letters Patent is hereby corrected as shown below:

Column 8, claim 17,
Line 35, change "devices paced in" to -- devices placed in --

Signed and Sealed this

Eleventh Day of December, 2001

Attest:

*Nicholas P. Godici*

NICHOLAS P. GODICI
*Attesting Officer*    *Acting Director of the United States Patent and Trademark Office*